Figure 1:
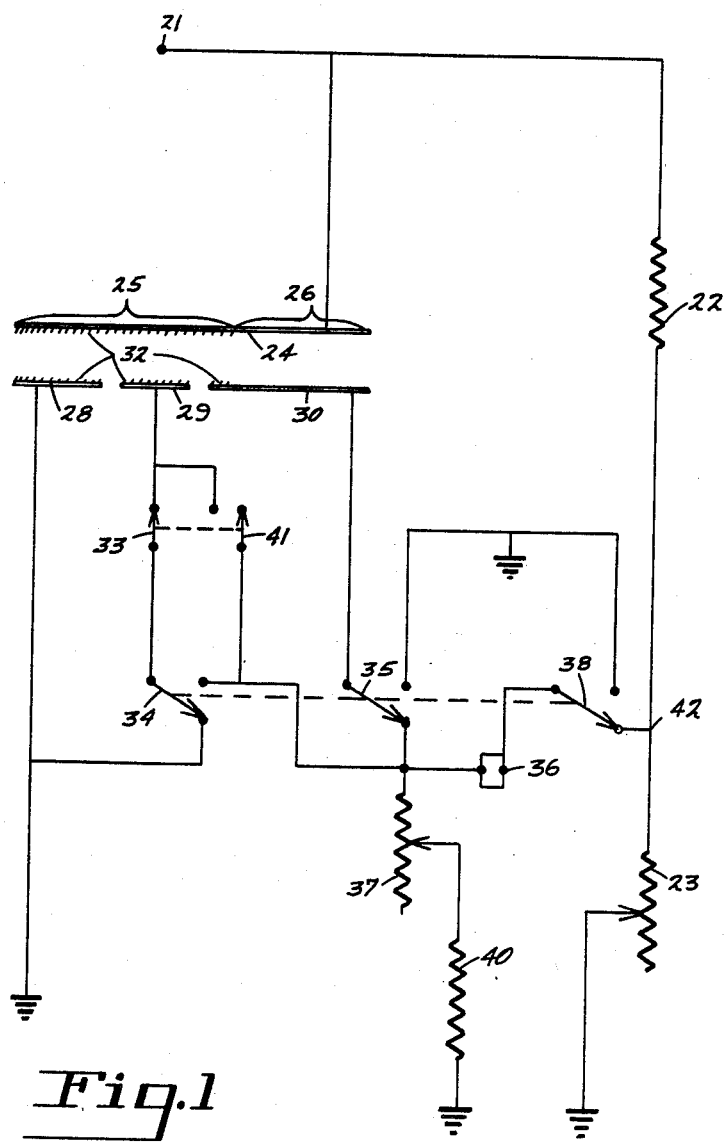

United States Patent Office 2,933,924
Patented Apr. 26, 1960

2,933,924
PULSATING FLUID FLOW METER

John D. Jenks, Inkster, Mich., assignor to Ford Motor Company, Dearborn, Mich., a corporation of Delaware Application January 25, 1957, Serial No. 636,283

3 Claims. (Cl. 73—194)

This invention pertains to a pulsating air flow meter which can measure and/or record flow in either direction.

This invention is intended as an improvement over conventional fluid flow meters in which means are provied for first ionizing, by means of radioactive elements, a flowing fluid, then collecting the ions on an electrode and then measuring the ion flow by means of a current sensitive meter connected to said electrode. This improvement permits measuring of a pulsating flow by inserting a third electrode in the ionizing chamber adjacent the collector electrode and connectnig this electrode to said current sensitive meter. A potrion of ion current is received by the third electrode and this poriton is substantially constant for all air flow quantities in the range of the meter when the air flow is towards the collector electrode because the third electrode receives as many ions from the end portion of the ion chamber as it loses to the collector chamber. However, when the air flow is reversed, the third electrode loses ions that are not regained from the non-ionizing collector chamber and hence there is a decrease in ion flow. This decrease will cause said current meter to deflect in the opposite direction in proportion to the reverse air flow.

These and other advantages will become more apparent when a detailed description of a preferred embodiment is made in connection with the drawing in which is shown a schematic diagram of a meter of this invention.

In the drawing a regulated direct current voltage is applied at 21 and is connected to ground in one path through a high resistance 22 and a zero adjusting resistance 23 and in a second path goes to positive plate 24 extending across ionizing chamber 25 and collector chamber 26. There are three negative electrodes 28, 29 and 30. Radioactive or ionizing material 32 is placed along electrodes 28 and 29 and just a small portion of electrode 30 as shown in the drawing to reduce the error of end effects. Switches 33 and 41 are mechanically linked and in the vertical position, shown, set the meter to measure unidirectional flow and a leftward movement sets the meter to measure pulsating flow. Electrode 28 is connected to ground and 29 is connected to ground through switches 33, 34. An alternate path connects electrode 29 through closed switch 41 to meter 36 and then to ground through zero adjust resistance 23 providing a pulsating flow measurement. Sensitivity adjusting resistance 37 is used to regulate the current flow through meter 36 and may be adjusted when switches 34, 35 and 38 are in the upper or check positions, grounding electrode 30 and sending current from electrode 29 through meter 36. Electrode 30 is connected to ground in one path through switch 35 and meter 36, switch 38 and adjusting resistance 23 and in a second path through resistances 37 and 40.

In the operation of this embodiment with switches 33, 41 as shown, fluid flow enters the left side of ionizing chamber 25 wherein radioactive matter 32 ionizes fluid partciles. These particles are collected by electrode 30 energizing meter 36 in one direction in linear proportion to the flow through the chambers. If desired, switches 33 and 41 may be turned leftwardly to measure pulsating flow whence electrode 29, in addition to electrode 30, will be connected to meter 36 and resistor 37. With both electrode 29 and electrode 30 connected to the resistor 37 substantially more current will flow through resistors 37 and 40 to ground, thus raising the potential of the left hand side of the meter 36. This potential may be balanced, if desired, by proper adjustment of the variable resistor 23 thus providing a zero reading on the meter 36 under no flow conditions. When fluid flows through the meter in the reverse direction, that is from right to left in the drawing, a portion of the ions collected on the electrodes 29 and 30 under no flow conditions are now collected by electrode 28 thus reducing the current flowing through resistors 37 and 40 to ground thereby lowering the potential of the left hand side of the meter 36 as shown on the drawings. This will cause the meter to deflect to measure reverse fluid flow. Thus, for pulsating air flows in which the flow may periodically reverse, that is first flow from left to right, and then from right to left in the drawings, the current through resistors 37 and 40 will increase over the no flow condition during periods of forward flow since the number of ions received by electrode 30 will increase and the number of ions received by electrode 29 will remain substantially constant. During periods of reverse flow, the current through resistors 37 and 40 will decrease since the electrode 30 will receive substantially no ions and a substantial portion of the ions received by electrode 29 during no flow conditions will now be received by electrode 28 which is grounded. The deflection of the meter 36 for reverse flow will be in opposite direciton to that caused by electrode 30 because ions will travel away from electrode 29 decreasing the current therein causing a negative or reverse deflection of meter 36. The meter will still measure forward flow since electrode 30 is still connected.

With switches 34, 35, and 38 in an upper position the current from electrode 29 will pass through the meter whereby adjustment 37 may be changed to provide the desired meter deflection. Zero adjustment resistance 23 may be changed with switches 34, 35 and 38 in the lower position to vary the potential at point 42 thereby regulating the flow through meter 36.

It will be understood that the invention is not to be limited to the exact construction shown and described, but that various changes and modifications may be made without departing from the spirit and scope of the invention, as defined in the appended claims.

I claim:

1. In a two way fluid flow meter for measuring the flow of a flowing fluid, an ionizing chamber comprising a first electrode, and a second and third electrode positioned in opposed relationship to said first electrode, a collection chamber positioned along the flow path of the fluid with respect to said ionizing chamber and comprising a pair of spaced electrodes, said electrodes having a means connected thereto for creating an electric field between the first electrode and the second and third electrodes of said ionizing chamber and between the pair of spaced electrodes of said collection chamber, means positioned in said ionizing chamber for ionizing said flowing fluid, an indicating means connected at one terminal thereof to one of the electrodes of said collection chamber and to said third electrode of said ionizing chamber.

2. In a two way fluid flow meter for measuring the flow of a flowing fluid, an ionizing chamber comprising a first electrode, and a second and third electrode positioned in opposed relationship to said first electrode, a collection chamber comprising a first electrode and a second electrode positioned in opposed relationship, with the first electrode of said ionizing chamber being positioned adjacent the first electrode of said collection chamber along the flow path of said fluid, and with the third electrode of said ionizing chamber being positioned between the second electrode of said ionizing chamber and the second electrode of said collection chamber along the flow path of said fluid, means for ionizing said fluid positioned in said ionizing chamber, means connected to said electrodes for creating an electric field between the first electrode and the second and third electrode of said ionizing chamber and between the opposed electrodes of said collection chamber and an indicating means connected at one terminal to the third electrode of said ionizing chamber and to the second electrode of said collection chamber.

3. In a two way fluid flow meter for measuring the flow of a flowing fluid, an ionizing chamber comprising a first electrode, and a second and third electrode positioned in spaced opposed relationship from said first electrode, a collection chamber comprising first and second spaced electrodes, the first electrode of said ionizing chamber being positioned adjacent the first electrode of said collection chamber along the flow path of said fluid and the third electrode of said ionizing chamber being positioned between the second electrode of said ionizing chamber and the second electrode of said collection chamber along the flow path of said fluid, means positioned in said ionizing chamber for ionizing said flowing fluid, a source of electrical potential connected to the first electrode of said ionizing chamber and the first electrode of said collection chamber for creating an electric field between the electrodes to which said source of potential is connected and the second and third electrodes of said ionizing chamber and the second electrode of said collection chamber, an indicating means, said third electrode of said ionizing chamber and said second electrode of said collection chamber being connected to one terminal of said indicating means for measuring the total ion collection of both the third electrode of said ionizing chamber and the second electrode of said collection chamber.

References Cited in the file of this patent

UNITED STATES PATENTS

| | | |
|---|---|---|
| 1,411,796 | Meyer | Apr. 4, 1922 |
| 1,808,709 | Blake | June 2, 1931 |
| 2,611,268 | Mellen | Sept. 23, 1952 |
| 2,627,543 | Obermaier | Feb. 3, 1953 |